(No Model.)
G. E. TERRELL.
CARBON BATTERY.
No. 378,943. Patented Mar. 6, 1888.
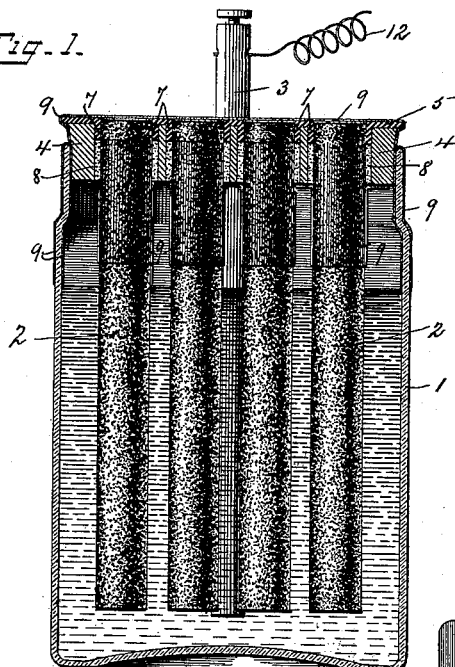
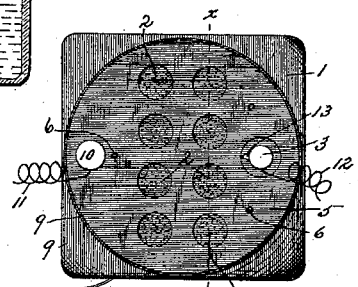
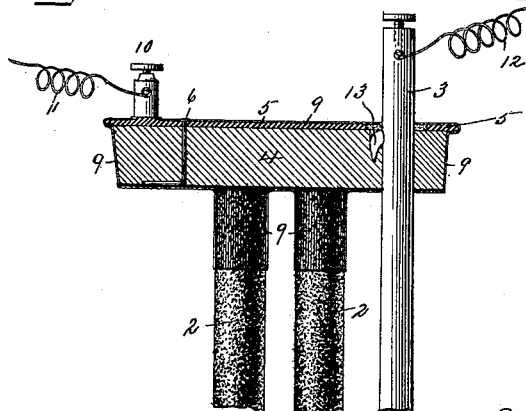
Witnesses
E. D. Smith
C. E. Ruggles
Inventor
George E. Terrell
By A. M. Wooster
Atty.

UNITED STATES PATENT OFFICE.

GEORGE E. TERRELL, OF ANSONIA, CONNECTICUT.

CARBON BATTERY.

SPECIFICATION forming part of Letters Patent No. 378,943, dated March 6, 1888.

Application filed June 13, 1887. Serial No. 241,114. (No model.)

*To all whom it may concern:*

Be it known that I, GEORGE E. TERRELL, a citizen of the United States, residing at Ansonia, in the county of New Haven and State of Connecticut, have invented certain new and useful Improvements in Carbon Batteries; and I do hereby declare the following to be a full, clear, and exact description of the invention, such as will enable others skilled in the art to which it appertains to make and use the same.

My invention has for its objects to simplify and cheapen the construction, increase the power, and to generally improve the operation of this class of batteries.

With these ends in view I have devised the simple and novel construction, of which the following description, in connection with the accompanying drawings, is a specification, numbers being used to indicate the several parts.

Figure 1 is a section of my improved battery on the line $x\ x$ in Fig. 3; Fig. 2, a detail sectional view illustrating the manner in which the zinc is held in place, and Fig. 3 is a plan view of the battery complete.

1 denotes the jar, 2 the carbons, and 3 the zinc.

The principle upon which my improved battery operates is the same as in ordinary carbon batteries—that is to say, a number of carbons and a rod of zinc are partially immersed in a solution in the jar, the ordinary solution being a saturated or nearly-saturated solution of sal-ammoniac. Heretofore in this class of batteries it has been common to close the jar with a heavy plate of lead, which has added considerably to the cost of the battery, and does not make the jar so tight but that the contents are spilled if the jar is upset.

In my improved battery I make use of a cork, 4, as a stopper and insulator. It is of course well known that cork is a very poor conductor. This is of great advantage in a battery of this class, and, furthermore, the use of this material enables me to seal the jar perfectly tight at the top.

5 denotes a metallic plate, ordinarily of brass, over the top of the cork, the cork and plate being attached firmly together by pins 6, or in any suitable manner.

It is very important that the amount of contact surface of the carbons with the top plate should be as great as possible. In order to get the greatest possible amount of contact-surface, I form holes in the plate by pressing the metal downward, so that a number of lugs, 7, are formed which bear against the carbon. Any number of these lugs may be formed—for example, five or six. These lugs bear against the carbons, as clearly shown in Fig. 1, there being sufficient spring in the metal to compensate for slight differences in the sizes of the carbons. I thus insure a practically perfect contact between the metal and each carbon entirely around the latter, which is a great improvement upon other batteries in which there are but two contact-points.

8 denotes holes in the cork into which the lugs 7 pass.

9 denotes paraffine, which is used freely about my improved battery, as in others of this class, being placed upon the inner and outer sides of the top of the jar, over the top of the plate, upon the bottom and sides of the cork, filling holes 8, and upon the upper ends of the carbons.

10 denotes the carbon pole, which is a stump projecting upward from the plate, having a hole through which the wire 11 passes, and a set-screw to secure the wire in the usual manner. The other wire, 12, is attached to the zinc in the same manner. Heretofore in this class of batteries in attaching the zinc wire it was necessary to hold the zinc with one hand, while the set-screw was turned down with the other. In order to hold the zinc firmly in place, I have provided a hooked pin or lug, 13, upon the zinc, which extends downward and is adapted to be forced into the cork to hold the zinc firmly in place at all times.

The advantages of my improved battery are, briefly, quite a reduction in the cost of manufacture, the perfect sealing of the battery, so that if accidentally upset the contents are not spilled, the fact that the zinc is firmly held in place at all times, and, lastly, the increased power without waste of the zinc, which I secure by the increased amount of contact-surface of the carbons with the top plate.

When used in connection with bells, for example, I have found that with my improved battery I can ring a bell with less battery power, or ring it much stronger with a battery of a given power.

The relative arrangement of the zinc and carbons in the battery has nothing whatever to do with my invention, as they may be arranged in any suitable or preferred form.

It will of course be understood that the general details of construction may be greatly varied without departing from the spirit of my invention.

I claim—

1. A carbon battery consisting, essentially, of a jar, a cork having holes to receive the zinc and carbons, and a top plate having downwardly-projecting lugs which surround and engage the carbons, whereby increased contact-surface is given.

2. In a battery, the combination, with a series of carbons, of a top plate having openings surrounded by spring-lugs 7, which embrace the carbons firmly on all sides, so that the greatest amount of contact-surface is insured and the carbons are held without supplemental devices.

3. The combination, with a top plate having downwardly-projecting lugs forced from the metal thereof, and a cork to which said plate is secured, of a series of carbons passing through holes in the cork and held in position by the lugs.

4. The combination, with the jar of a battery, of a cork whereby the top is sealed, a series of carbons, and a rod of zinc passing through said cork, and a top plate secured to the cork and having a series of downwardly-projecting lugs, whereby the carbons are held in place.

5. The combination, with the jar, of a cork and a rod of zinc provided with a hooked lug adapted to engage the cork, whereby the zinc is held firmly in place.

6. The combination, with the jar of a battery, of a cork which closes the jar and is provided with holes 8, a top plate having lugs extending downward into said holes, a series of carbons passing through said holes and held in position by said lugs, and a zinc, also passing through the cork and having a hooked lug engaging therewith, whereby it is held in place.

In testimony whereof I affix my signature in presence of two witnesses.

GEORGE E. TERRELL.

Witnesses:
 A. M. WOOSTER,
 C. E. RUGGLES.